July 1, 1924.　　　　　　　　　　　　　　　　1,499,602
R. E. BIBBINS
COMPASS
Filed May 17, 1921　　　　3 Sheets-Sheet 3

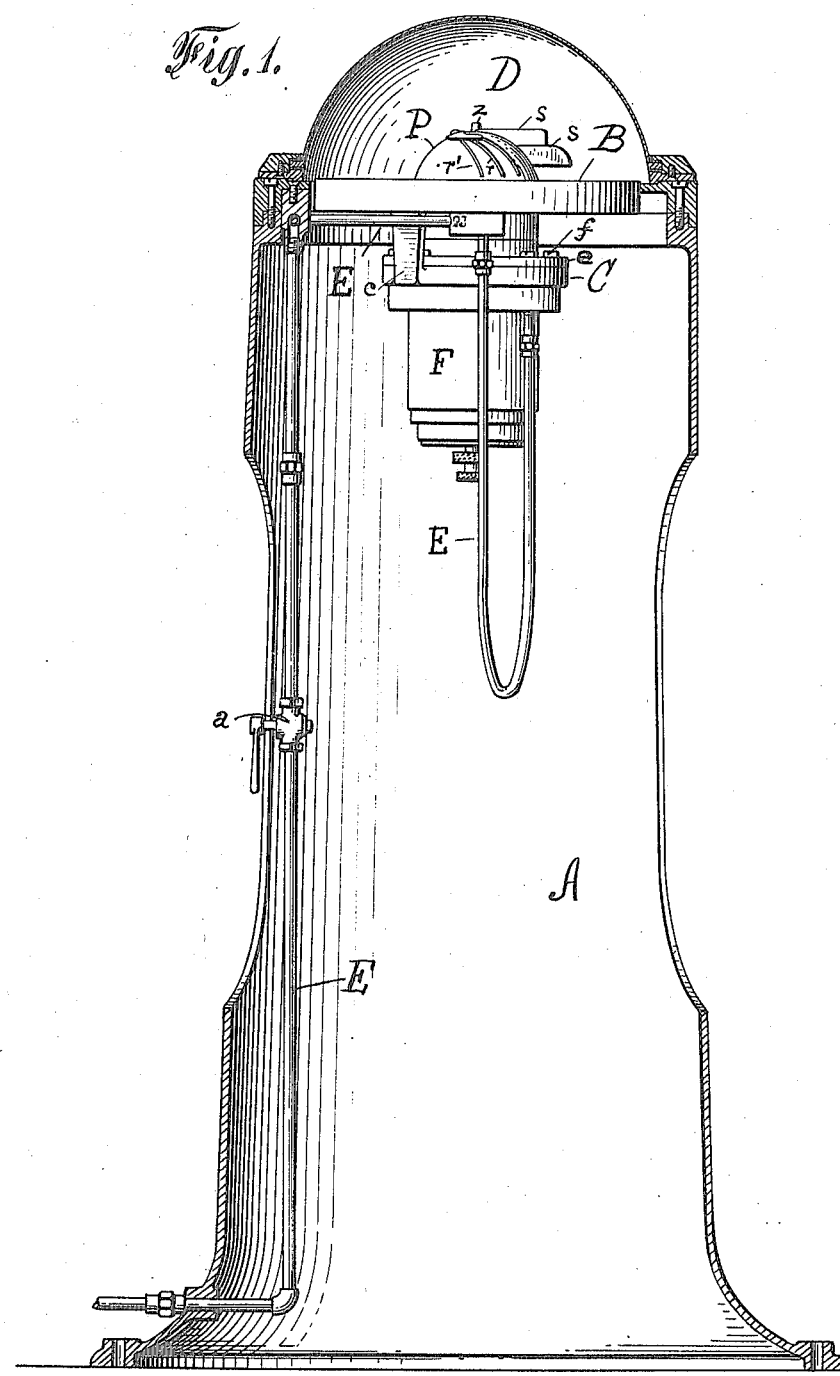

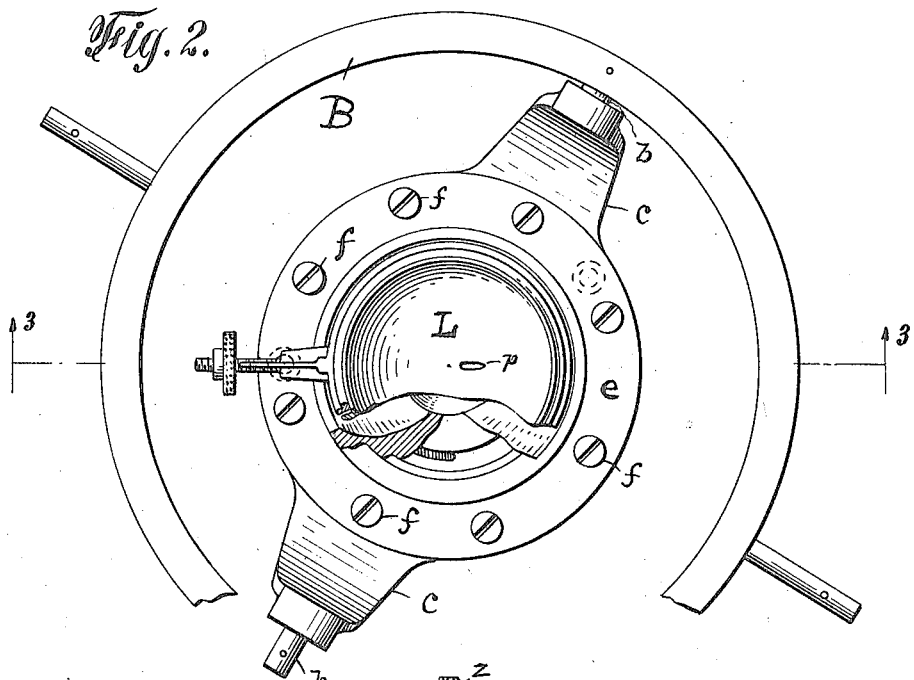
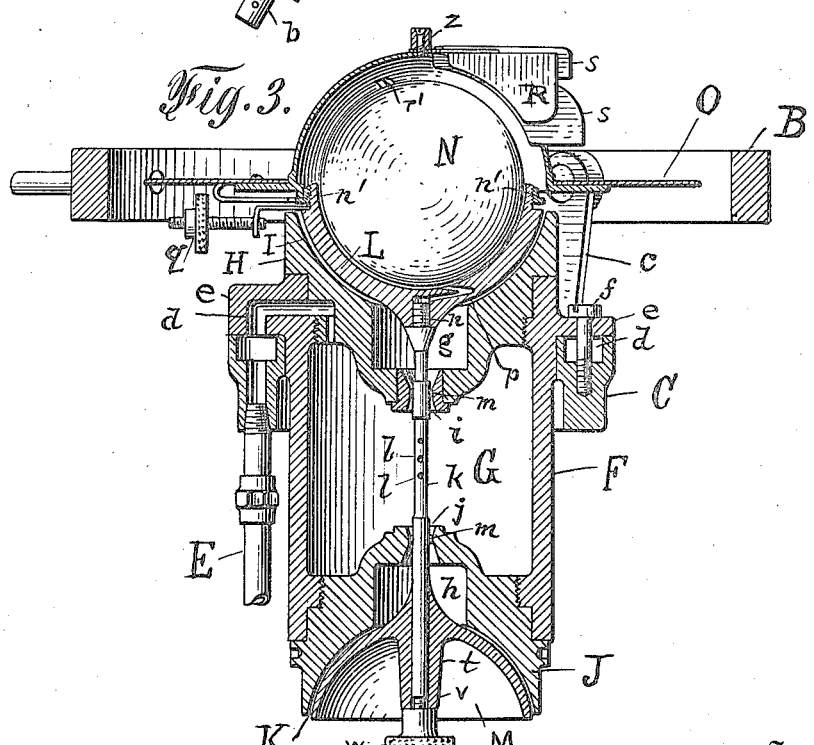

Royal E. Bibbins, Inventor
By his Attorney
W. P. Preble

Patented July 1, 1924.

1,499,602

UNITED STATES PATENT OFFICE.

ROYAL E. BIBBINS, OF NEW YORK, N. Y., ASSIGNOR TO BIBBINS BALL COMPASS, INC., A CORPORATION OF DELAWARE.

COMPASS.

Application filed May 17, 1921. Serial No. 470,291.

*To all whom it may concern:*

Be it known that I, ROYAL E. BIBBINS, a citizen of the United States, and a resident of the city, county, and State of New York (whose post-office address is 510 W. 144th Street, New York city), have invented certain new and useful Improvements in Compasses, of which the following is a specification.

The object of my invention is to provide a new form of compass in which the directive force is supplied by a spinning ball supported and driven by a current of air under proper conditions of pressure and direction of impact, and to make this instrument better balanced out and its indications more accurate than has heretofore been possible.

It will be understood that my new compass is to be mounted upon gimbal rings, or other mechanism adapted to keep the compass level during all the varied motions of the ship, as usual with ship's compasses.

In the accompanying drawings I have shown a simple form of my improved compass which I have found very effective, even on a small ship in a high sea.

Figure 1, is a side elevation of my compass set in a binnacle case of usual type.

Figure 2, is a top view of the compass,— the helmet and spinning ball being removed, —partly broken away to show the structure of the floating vessel in which the ball spins.

Figure 3, is a vertical section on line 3—3 of Figure 2.

Same letters indicate similar parts in the different drawings.

Figure 4:
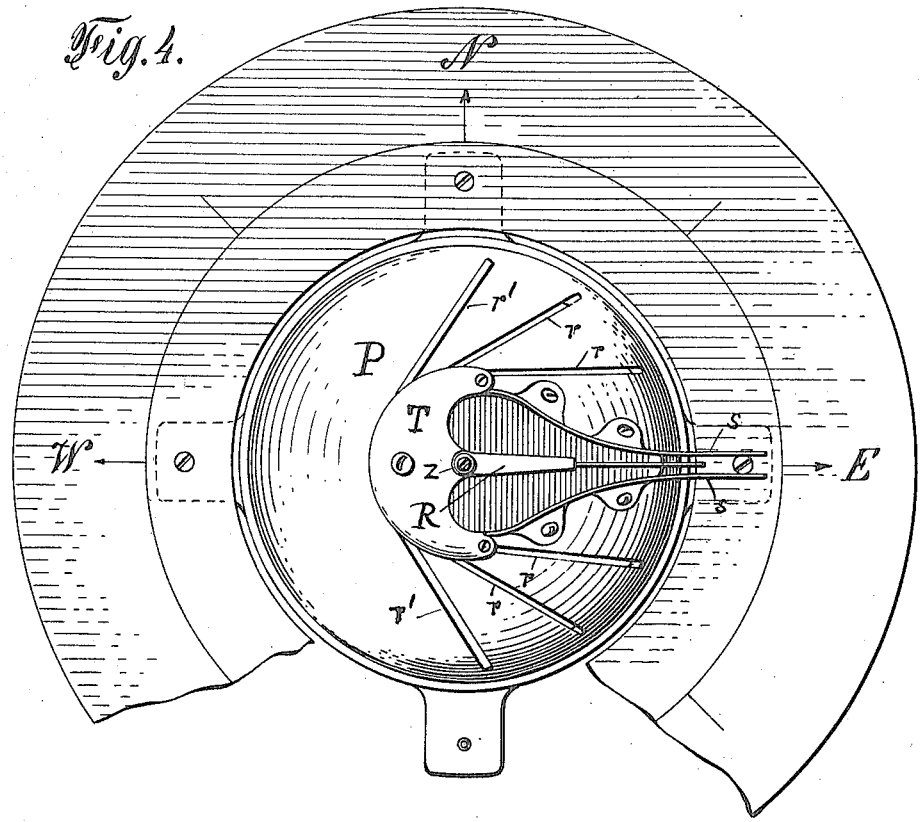
Figure 4, is a top plan of the compass to show the helmet, partly broken away.
Figure 5:
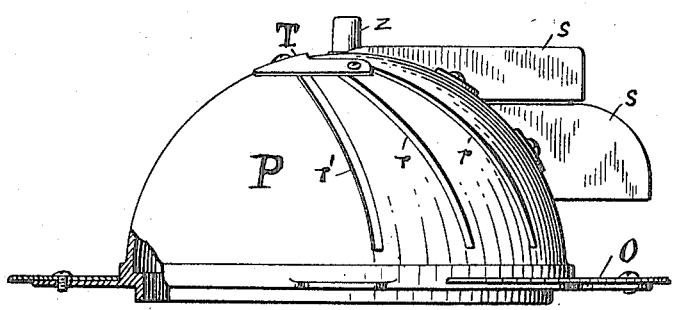
Figure 5, is a side elevation of the helmet.
Figure 6:
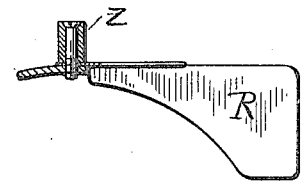
Figure 6, is a detail of the helmet-rudder.

A, is a binnacle case or stand of usual construction, and having two gimbal rings, B, C, mounted to swing at right angles to each other as usual, and covered by the usual glass dome D. The gimbal ring B, is of ordinary construction, but gimbal ring C, is of peculiar construction as hereinafter explained. The air by which the ball is supported and driven is supplied from a source of compressed air, (not shown) by a pipe E, having a stop-cock $a$, easily accessible from the outside of the binnacle case.

The gimbal ring C, is best shown in Figures 2 and 3. It hangs from two supporting pins, $b$, $b$, which project from two pendent arms $c$, $c$, made integral with the gimbal ring and support it in such a position that the centre of gravity is far below the level of the pins $b$, $b$. Within this ring is placed the hollow cylinder F, provided with an air chamber G, into which the air coming from the pipe E, enters by the passages $d$, $d$. This hollow cylinder has an annular flange $e$, which rests upon the gimbal ring and is secured thereto by machine screws as at $f$, $f$. The top of this cylinder is closed by the head H, screwed therein, the outer surface of which is hollowed out to form a hemispherical or cup-shaped basin I. The bottom of the cylinder is closed by a similar head J, with a similar cup-shaped basin K. At the bottom of each basin is an annular cushion chamber $g$, $h$, respectively, which serves as an air-cushion for the basins I, and K, respectively. The air thus escaping by the two ports $i$, $j$, is utilized, as hereafter explained, to balance out and steady the floating vessel in the upper part of which the ball spins.

One of the most important features of my improved compass is that the floating vessel is thus made steady and balanced out at all times so that no wabbling or uneven motion of said vessel takes place, but whatever displacement or swing may be communicated to it from any cause is uniform and regular,—somewhat after the swing of a pendulum. To this end I provide means for regulating and adjusting the amount and pressure of air which is allowed to escape from chamber G, by means of the ports $i$, $j$, into the cushion chamber $g$, $h$, and thence to the outer air through the basins I, K.

L, M, are two cups the outer or bottom surfaces of which are carefully shaped to conform as perfectly as possible to the inside curvature of the basins in which they are set respectively. These two cups face in opposite directions (the upper, up, and the lower, down, in Figure 3) and are attached to an adjustable hollow stem $k$, which is mounted in bushings, $m$, $m$, set in the ports $i$, $j$, respectively, approximately but not actually airtight. By this means a minute quantity of air, to the extent desired, can be allowed to seep constantly through the ports $i$, $j$, into their respective cushion chambers. When the air thus admitted to these cushion chambers has acquired the desired pressure, an amount which is determined largely by the weight of the entire floating vessel and its attachments, it is allowed to escape to the surrounding atmosphere by flowing through the hemispherical passageway left( adjustably) between the inner surface of the basin and the outer surface of the cup. This escaping air is a very thin film, being measurable only in ten-thousandths of an inch. The expansion or contraction of the space occupied by this minute film of escaping air is accomplished by means of the adjuster or set-nut $o$, which works against a central stem $t$, of the cup M, threaded on the screw-end $v$, of the stem $k$. The other screw-threaded end of this stem, is set fast in the bottom of cup L, and is hollow like the stem itself to permit the flow of air through said cup as hereafter explained. By turning the wheel $w$, right or left, the stem is drawn or moved to increase or decrease the distance between the two cups L, M, and by turning the wheel $y$, the device is set so that this distance is held fixed. By this means the pressure against the bottoms of the two cups is maintained at such a point that the structure, which may be called a double-ended floating vessel, assumes and retains a stable equilibrium with such desired rigidity that no pendulous swing or other displacement of the cylinder F or gimbal rings which may be caused by the motions of the ship on which the compass is mounted, or by any other cause can in any way disturb said double cupped vessel. The play needed to permit this result is inherent in the relative formation and structure of the cushion chambers, $g$, $h$,—the inlets or ports $i$, $j$,—and the valve-like character of the suspension of the cups in the basins,—all of which, preferably, are substantially as shown in Figure 3.

Experience has shown that an effective pressure of about thirty-five pounds to the square inch should be maintained inside the chamber G, at all times when the compass is in use, which, of course, means continuously during an entire voyage from port to port, and the major portion of this compressed air is to be used, not for the supporting and balancing out of the two cups just described, but for the support and continuous driving or spinning of the ball N. To do this I provide the hollow stem $k$, with a number of perforations $l$, $l$, and the cup L, with an offset nozzle $p$, so arranged as to eject a column of air at the proper angle against the, preferably, under surface of the ball N. It will be readily understood that the air thus ejected against the under side of the ball, if sufficient to sustain the fall free from any contact with the cup L, will cause the ball to spin around a horizontal axis and in a vertical plane determined by the direction of impact of the air current issuing from said nozzle.

To utilize this spin for compass purposes, it is obvious that the axis of the spinning ball should be at right angles to the equator of the earth, and that the equator of the ball should be in the plane of the earth's rotation, that is, the spin should be from west to east. The compass card O, (as hereafter explained) should therefore be so set that the north-south line corresponds with the axis of the spinning ball. The accuracy of the compass readings will depend, therefore, on the persistence with which the spinning ball maintains or regains its meridian as its axis of spin. Experience has shown that the above pressure of thirty-five pounds to the square inch inside the chamber G, if retained, will keep the ball spinning on its true north and south axis with a rigidity and persistence equal to all emergencies arising from the rotation of the earth, the motions of the ship, or other shocks or forces otherwise tending to displace said compass-card, and will cause said spinning ball to precess to the meridian with a speed and a certainty hitherto unattained, so far as I am aware.

The purpose of the helmet P, is to confine the air as it issues from the nozzle $p$, and keep it contacting with the ball, and thus aiding in its spinning, until the air current, still under pressure, has made nearly a complete circuit of the ball, and so to direct the final exit of the air that the desired steadiness and rigidity of the ball is not at any time interfered with by lack of uniformity of action on the part of the encompassing air. Preferably the point of final exit of the air is, as shown in the drawings, located on the same side of the cup L, as the nozzle so that the air will finally escape in the opposite direction to its entrance. To this end I provide the helmet with a visor T, through which the air is forced to escape in the direction of the arrow to east, in Figure 4, and to equalize the flow of the air as it passes through this visor, I provide a rudder R, therein, midway between the side-wings, $s$, $s$, of the visor and adjustable toward one side or the other by the rudder stem $z$, which may be readily turned by hand to set the rudder so that the same amount of air may pass out on each side thereof. By this adjustment great delicacy of action in controlling the spinning of the ball N, may be attained.

The helmet is mounted upon the cup L, by screw-threading as at $n'$, $n'$, as it is important in the original adjusting in setting the compass up on shipboard, that a perfect balance should be secured for the helmet and the vessel. The spinning ball which obviously will rest on the bottom of the inside of the cup L, when no air is supplied thereto, must be allowed to rise in obedience to the pressure of the incoming air, until it attains its maximum spin, and not be allowed to contact with the roof of the helmet. In other words the film of air surrounding and sustaining the spinning ball must be balanced out below the ball, around the ball, and above the ball, so that no physical contact shall take place between ball and cup or ball and helmet at any point during the use of the compass. A partial turn given to the helmet by hand will usually bring the adjustment desired at the first setting up of the compass and that becomes substantially the permanent adjustment for that particular compass. Once adjusted in this way, there is no reason why my improved compass should require any other attention than reading its returns except in the rare case of some accident which breaks or upsets some part of the apparatus.

The top of the helmet is provided preferably with a number of long, thin channels or nutes, r, r, to permit a partial escape of air laterally of the visor and a baffle r', which depends a short distance downwardly inside the helmet back of these nutes to deflect the air toward the entrance to the visor. These devices are, however, probably only of an auxiliary nature, for it will probably prove that they may be dispensed with when experience has perfected the relative construction of the helmet and vessel.

As shown in Figure 3 an adjustable counter-balance q, is secured to one side of the cup L. This is useful and desirable as the compasses are at present constructed by me, because of the lack of complete homogeneity in the metal of which the cups L, and M, their connections and the helmet are composed. It is generally observed therefore that when assembled and set up for use there is a little tendency to lean from the true plumb-line to one side or the other. By turning this counter-balance accordingly away from or toward the cup, its effective weight is thrown in favor of the side which thus proves to be lighter.

The compass card O, as shown in Figure 4, is to be attached to the lower flange of the helmet so that the rudder R points directly to the east, which, of course, brings the north and south line of the compass card in line with the axis of spin of the ball N.

All that is necessary to set up this compass is to place the device in some spot where the gimbal rings can receive the usual support and freedom of play,—face the compass so that the visor and rudder point to the true east,—and connect the source of air supply to the pipe E. A reasonable time after turning on the air should be allowed for the compass to steady itself and for the spinning ball to get into its stride of travel. As soon as this is accomplished (with thirty-five pounds pressure this should not take more than fifteen minutes or so) the compass card will give a true reading and continue so to do as long as said pressure is maintained.

The importance and usefulness of my invention will, I think, be obvious without further description.

I claim:—

1. A compass which comprises a spinning ball adapted to be supported and driven by a current of air under proper conditions of pressure and direction, whereby the directive force of said compass is supplied, a covered vessel adapted to contain said spinning ball without physical contact therewith and carrying a compass card,—said vessel being adapted to float freely suspended in a current of air and to be controlled by the directive force of said spinning ball,—and means depending from said vessel whereby it is steadied and its centre of gravity lowered with relation to its point of suspension.

2. A compass which comprises a spinning ball adapted to be supported and driven by a current of air under proper conditions of pressure and direction, whereby the directive force of said compass is supplied, a covered vessel adapted to contain said spinning ball without physical contact therewith,—said vessel being adapted to float freely suspended in a current of air and to be controlled by the directive force of said spinning ball,—and means whereby the upward and downward pressures applied to said vessel are balanced out and said vessel is rendered obedient to the directive force of said spinning ball.

3. A compass of the character described having an air-containing vessel floating upon and supported by a current of air,—part of which passes through said vessel, said vessel having an air-exit passage therefrom, and provided with an air-directing rudder and means whereby said rudder is adjusted to remain in the pressure centre of said passage and to direct the air which escapes from said vessel in a constant and fixed direction during the operation of said compass.

4. A compass of the character described having an air-supplying cylinder,—means having supporting pins for swingingly suspending said cylinder with its centre of gravity below the supporting pins,—and means whereby the air supplied by said cylinder is distributed under pressure throughout said compass whereby said compass is supported, driven, and stabilized as occasion arises.

5. A compass of the character described having an air-supplying cylinder,—means having supporting pins for swingingly suspending said cylinder with its centre of gravity below the supporting pins,—and a double-capped floating vessel mounted therein and adapted to remain constantly suspended by the air of said cylinder in vertical and horizontal equilibrium unaffected by the swinging of said cylinder.

6. A compass which comprises a spinning ball adapted to be supported and driven by a current of air under proper conditions of pressure and direction whereby the directive force of said compass is supplied, and a stabilized floating vessel, in which said ball spins, having means whereby the pressure of its supporting air is exerted equally in opposite directions at all times during the operation of said compass, and said vessel is free to respond to the directive force of said ball.

ROYAL E. BIBBINS.

Witnesses:
W. T. PREBLE,
DAVID MAY.